Figure 1:
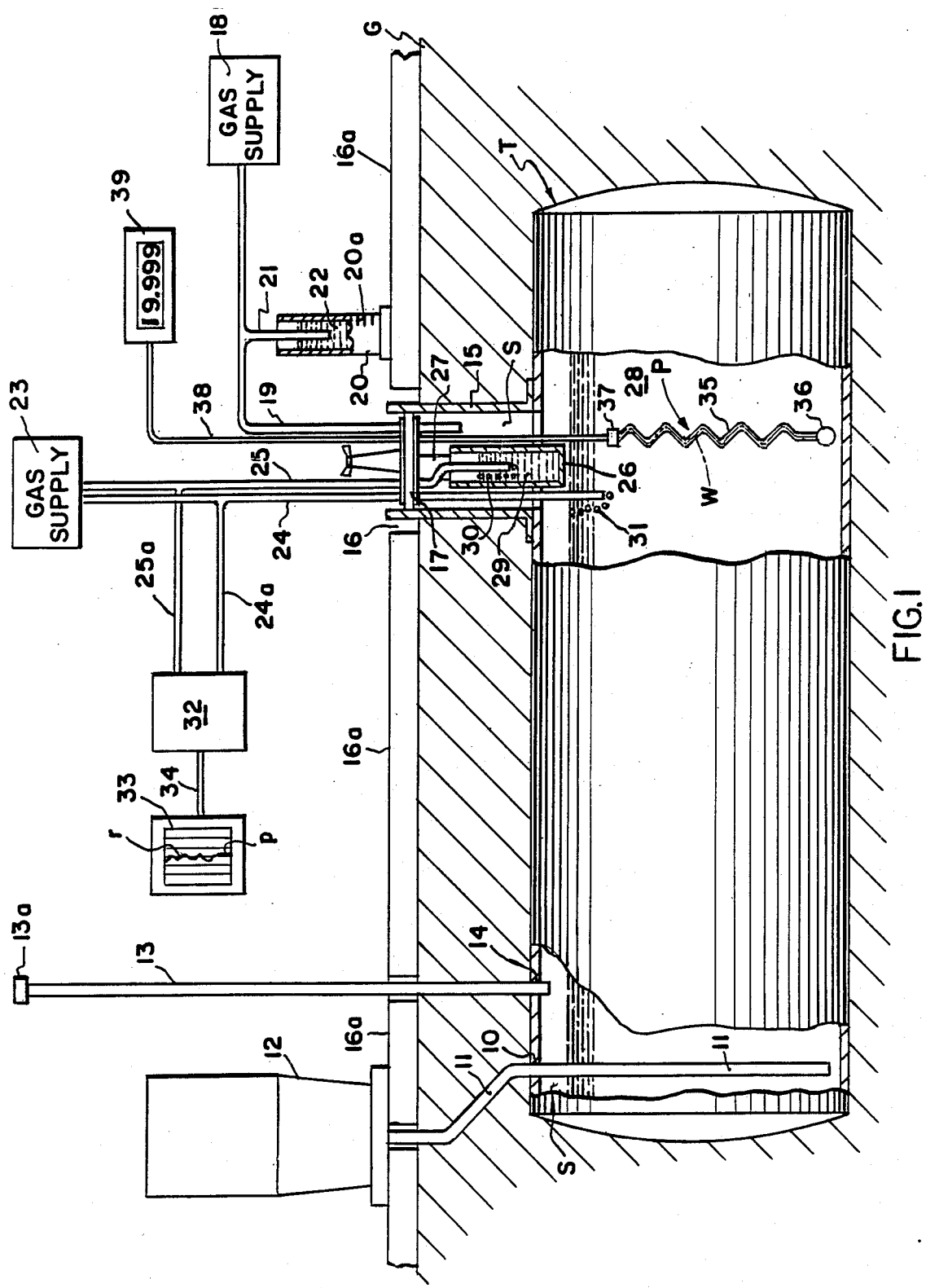

United States Patent [19]

Horner

[11] Patent Number: 4,885,931
[45] Date of Patent: Dec. 12, 1989

[54] SYSTEM FOR DETECTING LEAKS IN UNDERGROUND FUEL TANKS AND THE LIKE

[76] Inventor: John A. Horner, 387 River Dr., Lagoon Beach, Bay City, Mich. 48710

[21] Appl. No.: 167,779

[22] Filed: Mar. 14, 1988

[51] Int. Cl.⁴ .............................................. G01M 3/30
[52] U.S. Cl. ......................................... 73/49.2; 73/299
[58] Field of Search ............ 73/49.2, 299, 302, 290 R, 73/49.3, 40, 301; 340/614, 605

[56] References Cited

U.S. PATENT DOCUMENTS

| | | | |
|---|---|---|---|
| 4,442,702 | 4/1984 | Swada | 73/49.2 |
| 4,474,054 | 10/1984 | Ainlay | 73/302 |
| 4,571,987 | 2/1986 | Horner | 73/49.2 |
| 4,649,739 | 3/1987 | Horner | 73/49.2 |
| 4,669,309 | 6/1987 | Cornelius | 73/302 |
| 4,739,648 | 4/1988 | Horner | 73/49.2 |

FOREIGN PATENT DOCUMENTS 371451 11/1973 U.S.S.R. ............................. 73/49.2

*Primary Examiner*—Hezron E. Williams

[57] ABSTRACT

A system for detecting leaks in hazardous liquid tanks, particularly underground gasoline tanks at service stations. The tank is filled incompletely to leave a space in the tank which is then filled with a gas under pressure. A reference tank is disposed within this space and continuous streams of gas are forced into the liquid in the reference tank and the liquid in the tank being measured. Resistance to gas introduction in the reference tank is compared with the resistance to gas introduction in the gasoline tank and monitored during a test period to note any differential variation which would indicate a leak in the tank.

19 Claims, 1 Drawing Sheet

SYSTEM FOR DETECTING LEAKS IN UNDERGROUND FUEL TANKS AND THE LIKE

BACKGROUND OF THE INVENTION

Generally the invention is concerned with leak detection systems and methods of the type disclosed in the present applicant's U.S. Pat. No. 4,649,739 and pending application, U.S. Ser. No. 014,812 filed Feb. 13, 1987, which related to the detection of leaks in tanks such as the underground tanks employed for storing gasoline at gasoline service stations. Newer and better methods of detecting such leaks are continuously sought in view of the very rigid requirements in many states today regarding the permissible leakage from storage tanks holding hazardous liquids. Tanks at such service stations may typically be 26 feet long, cylindrical tanks having a diameter of 8 feet, and holding perhaps 10,000 gallons of gasoline. It is normal for approved testing personnel using approved leak detection equipment to periodically check the fuel leakage from such storage tanks to be certain that leakage is within the very negligible maximum leakage limits permitted. A number of methods have been proposed including those described in the aforementioned patent and application wherein the tanks are filled incompletely such that there is a space left in the tank above the liquid level in the tank which is filled with a gas which maintains a predetermined pressure on the liquid in the tank from one end of the tank to the other. In the previously mentioned patent, a bubbling tube was inserted into the liquid in the tank to a predetermined depth and the resistance to bubbling was balanced as a reference pressure against the static pressure of the gas in the space above the liquid. Any differential variation was indicated and recorded.

SUMMARY OF THE PRESENT INVENTION

A new method of detecting leaks involves insertion of a liquid containing reference receptable into the space above the liquid in the tank and the filling of the space in the tank above the liquid level with a non-atmosphere-contaminating gas under a greater than atmospheric pressure. Then a continuous stream of gas bubbles is forced simultaneously into the liquid in the tank and the liquid in the reference receptable at levels producing the same head resistance to bubble introduction in each. The pressures required to flow a continuous stream of bubbles into each are then monitored and any differential variation over the test time period is noted.

One of the prime objects of the present invention is to provide a highly precise method of testig which can be readily used to determine the integrity of an underground storage tank.

Another object of the invention is to provide a system for efficiently detecting unacceptable leaks in underground and other storage tanks to minimize the damages which might result from a fire.

Still another object of the invention is to provide a commercially viable method of measuring the loss of valuable and hazardous liquid from storage tanks which cannot be visually inspected.

Other objects and advantages of the invention will become apparent with reference to the accompanying drawing.

IN THE DRAWING

FIG. 1 is a schematic sectional elevational view illustrating the testing equipment used in testing position in an underground gasoline storage tank.

The underground steel storage tank which is illustrated may a be steel cylindrical tank, generally designed T. The tank T has a sealed opening 10 admitting a fuel removal pipe 11 leading to a gasoline pump 12 of conventional character which is operable to pump liquid from the tank T and dispense it via the usual hose and nozzle to vehicle fuel tanks. The tank normally, also, will have a vent pipe 13, leading from another sealed opening 14 in the upper wall of the tank, which is normally open at its upper end to prevent the build-up of undue gasoline vapor in the tank T. Line 13 is for purposes of the test closed by a plug or stopper 13a. For purposes of the test the liquid withdrawal conduit 11 is also normally sealed from the atmosphere.

Such tanks T are normally provided with fill pipes 15 which extend upwardly above ground level G and are accessible through openings 16 provided in the pump island curbs 16a. When the tank T is in normal use, the upper end of fill sleeve 15 is tightly sealed via insertion of a plumber's plug or other suitable, readily expandible, seal. During leak tests, it is sealed with a plumber's plug, generally indicated 17, which is special only in the sense that it has a series of sealed openings for the admission of certain conduits which will later be described.

Prior to the test procedure, the tank T is filled to a liquid level which leaves a space S in the top of the tank which typically may be from 6-12 inches in height and is open to the fill sleeve 15. Space S is considered to include also the space in the interior of fill sleeve 15 when the space in the body of the tank above the liquid level therein is defined. The space S is maintained under a predetermined low pressure greater than atmospheric pressure such as, for instance, 2-3 psi by a gas supply source 18 connecting with a tubular line 19 which extends down through the plumber's plug 17 into the fill sleeve 15 as shown. Gas supply source 18 may be a source of nitrogen which dispenses a supply of nitrogen gas to line 19 at a predetermined pressure. Control of the pressure in space S is accomplished by a vapor pressure column or standpipe control 20 filled with a liquid such as water having a substantially greater density or weight than the liquid or gasoline in tank T. As will be noted, the upper end of the column 20 is open to atmosphere and a pipe 21, communicating with pipe 19, leads into the liquid 22 therein and extends therein to a predesignated depth sufficient to maintain the pressure in space S at the desired value.

A second gas supply 23, which may be termed the bubbling gas supply, and which provides a flow of nitrogen or other gaseous medium to a pair of pipes 24 and 25, is provided to dispense separate flows of gas under the same constant pressure. Pipe 25 extends down through a sealed opening in the plug 17 and into a reference receptable 26 which can be supported from the plug 17 by means of straps 27 or the like. Pipe 24 extends down through a sealed opening in the plug 17 and is shown as immersed in the gasoline 28 in tank T to the same degree that pipe 25 is immersed in the receptacle 26. The liquid in receptacle 26 may also be gasoline 29 or could be water. Thus, nitrogen gas will continuously bubble out the end of pipe or tube 25, as indicated at 30, and a second flow of nitrogen gas will continuously bubble out the open end of pipe or tube 24, as indicated at 31, into the space S. With pipe 19 open to the space S, and open to the atmosphere via control 20, any build-up of pressure is avoided, inasmuch as excessive gas in space S is dissipated to atmosphere via pipe 21 and the liquid 22 in standpipe 20. Standpipe control 20 functions as a means for bleeding gas bubbles from the tank without exposing the tank to atmospheric pressures. Suitable numeraled graduations 20a are provided on the standpipe 20 to measure the amount of liquid maintained in the standpipe 20, the level of liquid being maintained at a depth such as to permit the continuous flow of gas bubbles to atmosphere without increasing the pressure in space S.

Branch pipes 24a and 25a lead from the conduits or pipes 24 and 25 to a control center 32 of the type described in my previously issued patent which includes a differential pressure transducer. The transducer at control center 32 may be a diaphragm type of the general character disclosed in U.S. Pat. No. 4,006,636, or may be a helical Bourdon tube type. Commercially available diaphragm transducers of this type, which operate when connected to a 12 volt, direct current power source are manufactured by Leeds and Northrup Corporation in Ohio. The pipe 24a connects to one side of the diaphragm and the pipe 25a connects to the other so that the pressures in each act in opposition. The transducer modulates or controls the voltage of an electrical power supply with which it is connected via movement of the diaphragm. The pressure differential is translated to an output voltage or signal which varies according to the amplitude of the pressure differential sensed at control center 32 and which is electronically filtered and amplified. The signal is translated to pen movement in a commercially available strip chart recorder or indicator 33 which, for example, may be a strip chart recorder of the type manufactured by Dianachart, Inc. of Rockaway, New Jersey. The conduit 34 is provided to house the wires leading from control center 32 to strip chart recorder 33. The strip chart recorder 33 includes a pen p operating on the vertically lined chart of the vertically moving paper strip in recorder 33 to trace a differential indicating reference line r, and any leakage will be accurately indicated on the continuously moving paper strip on which the line r is marked by pen p. There are similarly digital readouts at both the control center 32 and strip chart recorder 33 which can be monitored.

When it is desired to reference the differential pressure sensed with any temperature changes which might occur in the tank over the test period, a device such as disclosed in my U.S. Pat. No. 4,618,268 is provided in the tank and connected to a separate digital readout device. The probe, generally designated P, which is used, provides a method of determining average temperature and will not be again specifically disclosed in the present specification. Probe P may comprise an outer helical plastic tube 35 having a weight 36 at its lower end. Tube 35 houses a platinum sensing wire W which extends from the connector 37 in the form of a closed loop. Suitable electrically conductive wires lead from the connector 37 to which the ends of the platinum wire W connect through conduit 38 to the digital measuring and display module 39. The electrified sensing wire W has an electrical resistance which changes very measurably with changes in temperature and can be used with a wheatstone bridge resistance measuring system in the usual manner. As noted in Pat. No. 4,618,268, the relative spacing between coil turns is such that the density of coil turns is commensurate with the depth-volume profile of the liquid in the tank.

THE OPERATION

When a test of tank T is to be undertaken, the normal plug which caps fill pipe 15 is removed and the plug 17 (with the pipes 24, 25, and 19 and the reference tank 26, all of which may be supported by the plug 17) is inserted. Prior to this, tank T will be filled to the extent desired to bring it to the level disclosed in FIG. 1 wherein space S remains above the body of gasoline 28 in the tank. Typically the pressure regulator and flow meter on the bottled gas supply 18 dispense gas under pressure to the space S until such time as a predesignated pressure such as 2-3 psi is achieved in space S and gas begins to bubble out of column 20 to atmosphere. When tank T is imbedded in an location in which there is a relatively high water table, a slightly greater pressure is preferably utilized. Once the designated pressure is established in space S, the gas supply 18 will not supply further gas to the space S. With the continuous bubbling flow through tubes 24 and 25, the tendency is for the pressure in space S to increase, but this is prevented with the release of nitrogen gas to atmosphere at standpipe 20. Once a designated pressure is established in space S, the bottled gas supply 23 flows a continuous supply of nitrogen gas through tubes 24 and 25, such that a continuous flow of bubbles is achieved. The resistance or back pressure to continuous flow bubbling is directly proportional to the head of liquid in both the stainless steel reference tank 26 and the tank T at the level of the outlet ends of tubes 24 and 25. Any change in the pressure required to maintain a continuous stream of bubbles is instantly reflected in the pressure of the gas in branch tubes 24a and 25a and is picked up by the pressure transducer at control center 32. Any slight leakage indicated by any differential pressure change is translated by the transducer into an amplified electrical output signal whose magnitude is translated by the linear potentiometer or control driving the pen p on the continuously vertically moving paper strip to move pen p. Deviations from the linearity of the reference line r will be indicated on the paper strip, and deviations will also be monitored at the digital readout.

Differential variations can be considered with respect to any variations of temperature noted at the temperature readout 39 and the comparative results analyzed to check whether the deviations indicate an unacceptable leak in tank T over the typically hour duration of the test. The test is conducted with precision, without overfilling the tank as many test systems require and, in so doing, perhaps initiating an unauthorized gasoline discharge due to a tank top or vent line leak. In the present system, there is no evaporation of fuel and the problems concerned with entrapped vapor, tank end deflection, and high water tables are avoided.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

I claim:

1. A system for detecting leaks in incompletely filled liquid storage tanks, incorporating projecting fill and vent pipes, which systems are connected with a liquid withdrawal system normally isolated from the atmosphere, comprising:

a. means for filling the tank space above the surface of the liquid therein with a gas under a pressure greater than atmospheric pressure and maintaining a gaseous pressure on the said liquid surface;
b. a fluid containing receptacle disposed in the tank space above the surface of the liquid;
c. means including a pair of tubular parts, one extending to a predetermined depth of submersion in the liquid in the tank and the other extending to a predetermined depth of submersion in the fluid in the receptacle for forcing a continuous stream of bubbles of gas into the said liquid and into the said fluid whereby the resistance to gas introduction is influenced in each by the composite effect of the pressure of the gas on the surface of the liquid and the head at which the bubbles are introduced; and
d. means for balancing the pressure required to flow the continuous stream of bubbles into the liquid against the pressure required to flow the continuous stream of bubbles into said fluid and indicating any differential pressure variation over a time period.

2. The invention defined in claim 1 wherein means is provided for bleeding the gas bubbles introduced from the tank without exposing the tank to atmospheric pressure.

3. The invention defined in claim 1 wherein said receptacle is disposed substantially within said fill pipe.

4. The invention defined in claim 1 wherein said balancing means includes a differential pressure transducer connected with a strip chart recorder, said transducer translating any differential pressure into an electrical signal, and said recorder having a pen moved on the chart of the recorder in proportion to the amplitude of the signal.

5. The invention defined in claim 1 wherein said liquid is gasoline and said fluid is water or gasoline.

6. The invention defined in claim 2 wherein sad bleeding means comprises a liquid containing standpipe open to atmosphere, a tubular member extends into said space above the liquid in said tank and into the said liquid in the standpipe at a predetermined level of submersion to bleed bubbles of gas introduced into said space through the liquid in the standpipe to atmosphere; and said means for filling the tank space, above the surface of the liquid therein, includes a gas supply connecting with saidtubular member to permit it to function as a gas introduction member.

7. The invention defined in claim 6 wherein a separate supply of gas under pressure connects with said pair of tubular parts.

8. The invention defined in claim 7 wherein each of said supplies of gas under pressure provides gaseous nitrogen.

9. The invention defined in claim 1 wherein each of said tubular parts is connected with a source of gas dispensing the gas at the same pressure.

10. A method of detecting a leak in a liquid storage tank having a tank body, incorporating projecting fill and vent pipes, which is connected with a liquid withdrawal system closed to atmosphere, and which is filled incompletely to leave a top space in the tank above the liquid surface level; the steps of:
a. inserting a fluid-containing receptacle into said space;
b. filling the space in the body of the tank above the liquid level with a gas under a greater than atmospheric gaseous pressure, and maintaining the pressure in said space;
c. forcing a continuous stream of gas bubbles simultaneously into the liquid and fluid at levels producing the same head resistance to bubble introduction in each; and
d. monitoring the pressures required to flow a continuous stream of bubbles into each of the liquid and fluid, and indicating any variation thereof over a test time period.

11. The method of claim 10 wherein the pressures required to bubble into the liquid and fluid are imposed in opposition over said time period and any pressure differential is indicated.

12. The method of claim 11 wherein said pressure differential is converted to an amplified electrical signal which is employed to move the pen of a strip chart recorder in proportion to the amplitude of the signal.

13. The method of claim 10 wherein gas bubbles introduced are bled to atmosphere without exposing said space to atmospheric pressure.

14. The method of claim 13 wherein the gas bubbled to the liquid and fluid is bubbled from a source supplying it at the same pressure.

15. The method of claim 14 wherein the source is a nitrogen gas source.

16. The method of claim 13 wherein a source for filling the space above the liquid with said gas under pressure also communicates with a liquid filled standpipe open to atmosphere, to function also to bleed the bubbles introduced to atmosphere while maintaining the gaseous pressure in said space.

17. The method of claim 16 wherein the gas supplied to said space and the gas bubbled to said liquid and fluid are all nitrogen.

18. The method of claim 16 in which the liquid in said standpipe is a liquid of substantially greater density than the liquid in said tank.

19. The method claim 18 in which said liquid in the standpipe is water.

* * * * *